(12) United States Patent
Funasugi et al.

(10) Patent No.: US 11,719,315 B2
(45) Date of Patent: Aug. 8, 2023

(54) TORQUE LIMITER AND DRIVE DEVICE

(71) Applicant: MINEBEA MITSUMI Inc., Nagano (JP)

(72) Inventors: Yukimasa Funasugi, Zama (JP); Shigeru Iwase, Akishima (JP); Shinji Koike, Saitama (JP); Yusuke Akama, Minato-ku (JP)

(73) Assignee: MINEBEA MITSUMI Inc., Nagano (JP)

( * ) Notice: Subject to any disclaimer, the term of this patent is extended or adjusted under 35 U.S.C. 154(b) by 620 days.

(21) Appl. No.: 16/613,002

(22) PCT Filed: May 15, 2018

(86) PCT No.: PCT/JP2018/018664
§ 371 (c)(1),
(2) Date: Nov. 12, 2019

(87) PCT Pub. No.: WO2018/216541
PCT Pub. Date: Nov. 29, 2018

(65) Prior Publication Data
US 2020/0166109 A1    May 28, 2020

(30) Foreign Application Priority Data

May 22, 2017    (JP) .............................. JP2017-101017

(51) Int. Cl.
*F16H 35/10*    (2006.01)
*F16D 7/02*    (2006.01)
(Continued)

(52) U.S. Cl.
CPC .............. *F16H 35/10* (2013.01); *F16D 7/02* (2013.01); *F16D 43/21* (2013.01); *F16F 15/1297* (2013.01)

(58) Field of Classification Search
CPC .... F16D 7/02; F16D 7/024–027; F16D 43/21; F16D 43/213–216; F16H 35/10;
(Continued)

(56) References Cited

U.S. PATENT DOCUMENTS

2011/0120830 A1    5/2011    Heidenreich et al.
2017/0335895 A1    11/2017    Kobayashi et al.

FOREIGN PATENT DOCUMENTS

| CN | 102072265 A | 5/2011 |
|---|---|---|
| JP | 49-014848 A | 2/1974 |

(Continued)

OTHER PUBLICATIONS

First Office Action dated Jun. 2, 2021 for corresponding Chinese Application No. 201880033655.5 and English translation.
(Continued)

*Primary Examiner* — Lori Wu
(74) *Attorney, Agent, or Firm* — Pearne & Gordon LLP

(57) ABSTRACT

Provided is a smaller torque limiter. A torque limiter (30) according to a representative embodiment of the present invention is characterized by including: a first rotary body (32) to be rotated by a drive source; a first friction body (33) locked to the first rotary body; a second friction body (34) stacked on the first friction body and to be rotated with rotation of the first friction body by a friction force between the first friction body and the second friction body; a second rotary body (35) locked to the second friction body; at least one disc spring (37) for biasing the first friction body and the second friction body in the stacking direction of the first friction body and the second friction body; and a fastening member (39) for applying a compressive force to the disc spring.

4 Claims, 10 Drawing Sheets

(51) Int. Cl.
*F16D 43/21* (2006.01)
*F16F 15/129* (2006.01)

(58) Field of Classification Search
CPC . F16H 55/36; F16F 15/1297; B25D 2250/165
See application file for complete search history.

(56) References Cited

FOREIGN PATENT DOCUMENTS

| | | |
|---|---|---|
| JP | 52-053331 A | 4/1977 |
| JP | 61-116234 U | 7/1986 |
| JP | 01-316558 A | 12/1989 |
| JP | 2002-048212 A | 2/2002 |
| JP | 2007-139012 A | 6/2007 |
| JP | 2008-095322 A | 4/2008 |
| JP | 2014-149013 A | 8/2014 |
| JP | 2014-194248 A | 10/2014 |
| JP | 2016-151297 A | 8/2016 |

OTHER PUBLICATIONS

International Search Report for corresponding International Application No. PCT/JP2018/018664 dated Aug. 21, 2018.
Written Opinion for corresponding International Application No. PCT/JP2018/018664 dated Aug. 21, 2018.
Notice of Reasons for Refusal dated Mar. 15, 2021 for corresponding Japanese Application No. 2017-101017 and English translation.
International Preliminary Report on Patentability for corresponding International Application No. PCT/JP2018/018664 dated Nov. 26, 2019.
English translation of Written Opinion for corresponding International Application No. PCT/JP2018/018664 dated Aug. 21, 2018.

TORQUE LIMITER AND DRIVE DEVICE

TECHNICAL FIELD

The present invention relates to a torque limiter and a drive device using the torque limiter.

BACKGROUND ART

Conventionally, there has been known a technique related to a so-called torque limiter which limits transmission of torque by blocking or the like when torque exceeding a predetermined level is applied. For example, Patent Literature 1 discloses a technique of realizing a torque limiter function by a ratchet mechanism.

DOCUMENT LIST

Patent Literature(s)

Patent Literature 1: Japanese Patent Application Laid-Open No. 2014-149013

SUMMARY OF INVENTION

Technical Problem

In recent years, with the demand for downsizing of an entire apparatus incorporating a torque limiter, the torque limiter as a component applied to the apparatus is also required to be downsized.

In view of the above-mentioned problem, it is an object of the present invention to provide a smaller torque limiter.

Solution to Problem

A torque limiter according to a representative embodiment of the present invention is characterized by including: a first rotary body to be rotated by a drive source; a first friction body locked to the first rotary body; a second friction body stacked on the first friction body and to be rotated with rotation of the first friction body by a friction force between the first friction body and the second friction body; a second rotary body locked to the second friction body; at least one disc spring for biasing the first friction body and the second friction body in a stacking direction of the first friction body and the second friction body; and a fastening member for compressing the disc spring.

Effects of Invention

According to one aspect of the present invention, it is possible to provide a smaller torque limiter.

DESCRIPTION OF EMBODIMENTS

1. Outlines of Embodiments

Figure 1:
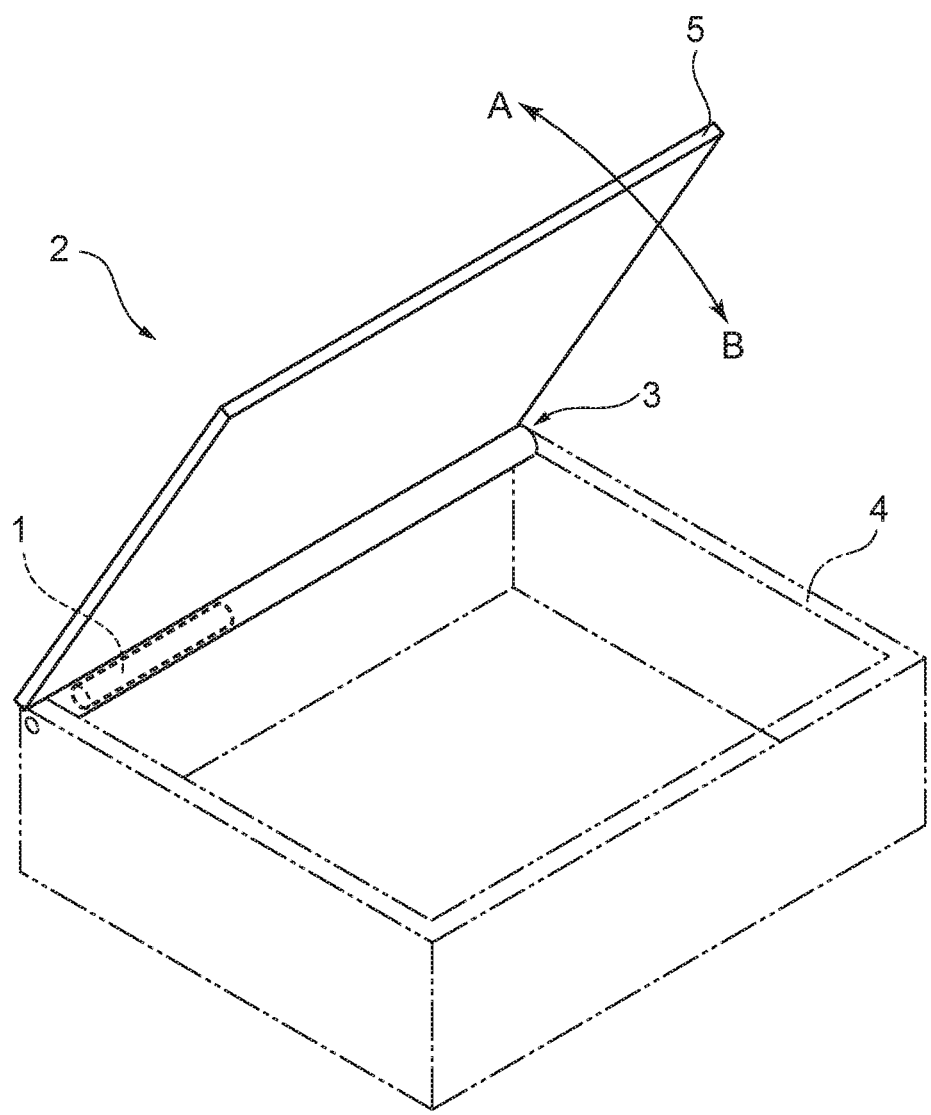
FIG. 1 A perspective view of an apparatus in which a drive device including a torque limiter according to an embodiment of the present invention is arranged.

First, outlines of representative embodiments of the invention disclosed in the present application will be described. In the following description, as an example, reference signs on the drawings corresponding to components of the invention are indicated in parentheses.

[1] A torque limiter (30, 40) according to a representative embodiment of the present invention is characterized by including: a first rotary body (32, 41) to be rotated by a drive source (10); a first friction body (33, 43) locked to the first rotary body; a second friction body (34, 44) stacked on the first friction body and to be rotated with rotation of the first friction body by a friction force between the first friction body and the second friction body; a second rotary body (35, 42) locked to the second friction body; at least one disc spring (37, 45) for biasing the first friction body and the second friction body in the stacking direction of the first friction body and the second friction body; and a fastening member (39, 46) for applying a compressive force to the disc spring.

[2] In the torque limiter, the fastening member may fix the disc spring to the first rotary body without contacting the second rotary body.

[3] In the torque limiter (30), the first rotary body (32) and the second rotary body (35) have the same rotation axis (31), the first friction body (33) and the second friction body (34) are stacked between the first rotary body and the second rotary body on the rotation axis, the disc spring is arranged coaxially with the first rotary body and in contact with the first rotary body, and the fastening member may press and fix the disc spring against the first rotary body.

[4] In the torque limiter (40), the first rotary body (41) has a bottomed hole (410) formed in the direction of the rotation axis and a first screw portion (412) formed on an inner circumferential surface (410a) on the opening side of the first rotary body formed with the hole, the first friction body (43) and the second friction body (44) are annular and arranged coaxially with the rotation axis of the first rotary body in the hole of the first rotary body, the disc spring (45) is arranged coaxially with the rotation axis of the first rotary body and in contact with at least one of the first friction body and the second friction body in the hole of the first rotary body, the fastening member (46) has a second screw portion (460) corresponding to the first screw portion of the first rotary body, and a through-hole (461) formed through the rotation axis of the fastening member, the fastening member is fixed to the first rotary body by screwing the second screw portion and the first screw portion of the first rotary body while pressing the disc spring, the first friction body and the second friction body against a bottom surface (410b) of the hole of the first rotary body, and the second rotary body is inserted through the through-hole of the fastening member and hollow portions of the annular first friction body and second friction body and may not contact the fastening member.

[5] A drive device (1, 1A) according to a representative embodiment of the present invention is characterized by including: the above-described torque limiter (30, 40); a drive part (10, 11, 13) for rotationally driving the first rotary body; and a transmission part (20, 12) for transmitting rotation of the second rotary body to a drive target (5).

2. Specific Examples of Embodiments

Hereinafter, specific examples of embodiments of the present invention will be described with reference to the drawings. In the following description, components common to the respective embodiments are labeled with the same reference signs, and repeated description is omitted. It should also be noted that the drawings are schematic, and the dimensional relationships among the respective components, the ratio of the respective components, and the like may be different from the reality. There may be a case where the dimensional relationships or ratio are different even between the drawings.

Embodiment 1

FIG. 1 is a perspective view of an apparatus in which a drive device including a torque limiter according to Embodiment 1 of the present invention is arranged.

A drive device 1 according to the present embodiment is placed in a hinge part 3 of an apparatus main body 4 of an apparatus 2 including a movable part 5, and drives the movable part 5 to open and close. Examples of the apparatus 2 include a toilet with an electric toilet seat lid opening and closing function which has a toilet seat and a toilet seat lid as the movable part 5, a laptop personal computer having a display as the movable part 5, and containers such as a trash box having a lid as the movable part 5.

Figure 2:
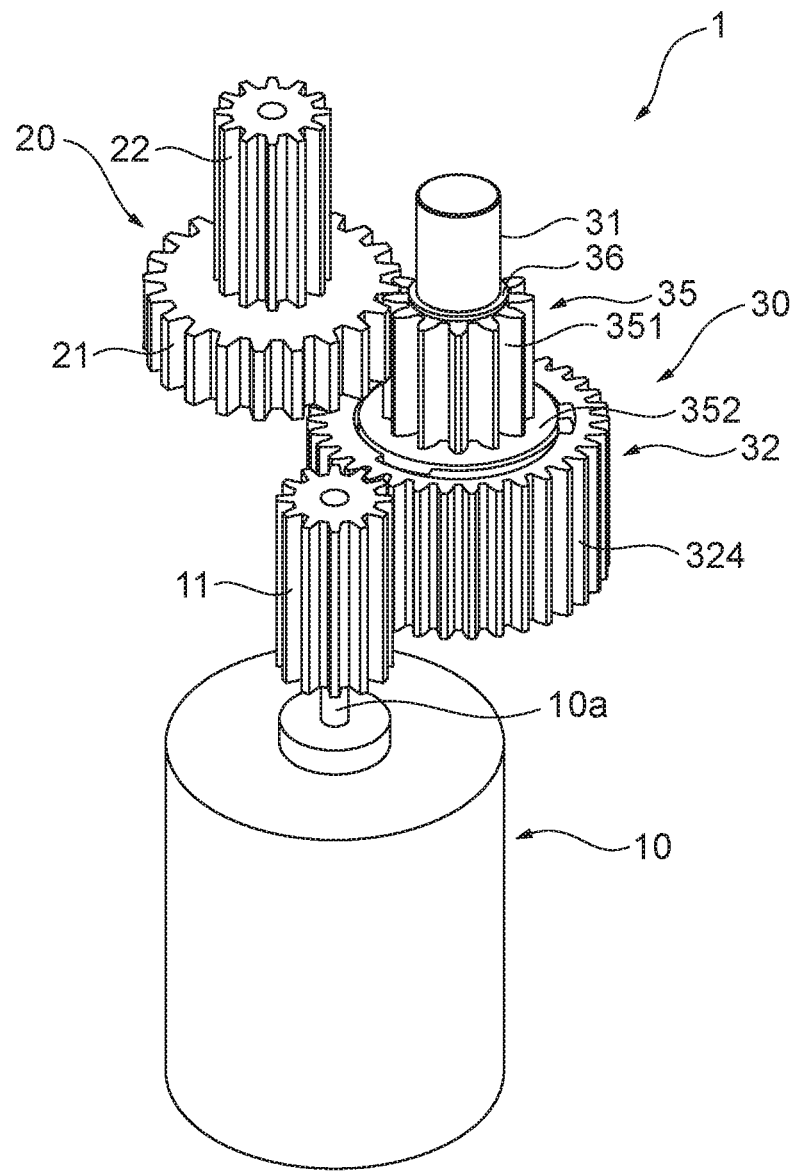
FIG. 2 A perspective view of a drive device including a torque limiter according to Embodiment 1.

FIG. 2 is a perspective view of the drive device including the torque limiter according to Embodiment 1.

Specifically, the drive device 1 includes a motor 10, a first gear part 20, and a torque limiter 30.

The motor 10 functions as a drive source/power source for the opening and closing operation of the movable part 5 in the apparatus 2. A drive signal is supplied to the motor 10 through a lead wire (not shown), and an output rotary shaft 10a of the motor 10 is rotated by the drive signal. A gear 11 is attached to the tip portion of the output rotary shaft 10a of the motor 10. Here, as the motor 10, for example, a stepping motor, a DC motor, a DC brushless motor, or the like can be used.

The motor 10 and the gear 11 function as a drive part for driving a later-described second gear part 32 of the torque limiter 30.

The first gear part 20 is a functional part that transmits a rotational force generated by the motor 10 to a rotation shaft (opening and closing drive shaft) of the movable part 5 through a gear train (not shown) or the like. The first gear part 20 transmits the torque transmitted from the motor 10 through the torque limiter 30 to the movable part 5 as a drive target. The first gear part 20 has a large-diameter gear 21, and a small-diameter gear 22 coaxially fixed to the large-diameter gear 21. The small-diameter gear 22 is connected directly or through a gear train to a gear connected to the rotation shaft (opening and closing drive shaft) of the movable part 5. The large-diameter gear 21 meshes with a later-described third gear 351 of the torque limiter 30. The large-diameter gear 21 and the small-diameter gear 22 are formed of, for example, resin.

The first gear part 20 functions as a transmission part for transmitting rotation of a later-described third gear part 35 of the torque limiter 30 to the movable part 5 as the drive target.

The torque limiter 30 is a safety device that limits the torque to be transmitted, and transmits the rotational force generated by the motor 10 to the first gear part 20, but limits the torque to be transmitted between the first gear part 20 and the motor 10 if the torque exceeding a predetermined threshold value (hereinafter also referred to as the "slip torque value") is applied in one of predetermined directions by an external force.

Hereinafter, the configuration of the torque limiter 30 will be described using FIGS. 3 to 6.

As shown in FIGS. 3 to 6, the torque limiter 30 includes a shaft 31, the second gear part 32 as the first rotary body, a first friction body 33, a second friction body 34, the third gear part 35 as the second rotary body, a slide washer 36, a disc spring 37, a washer 38, and a nut 39.

Figure 4:
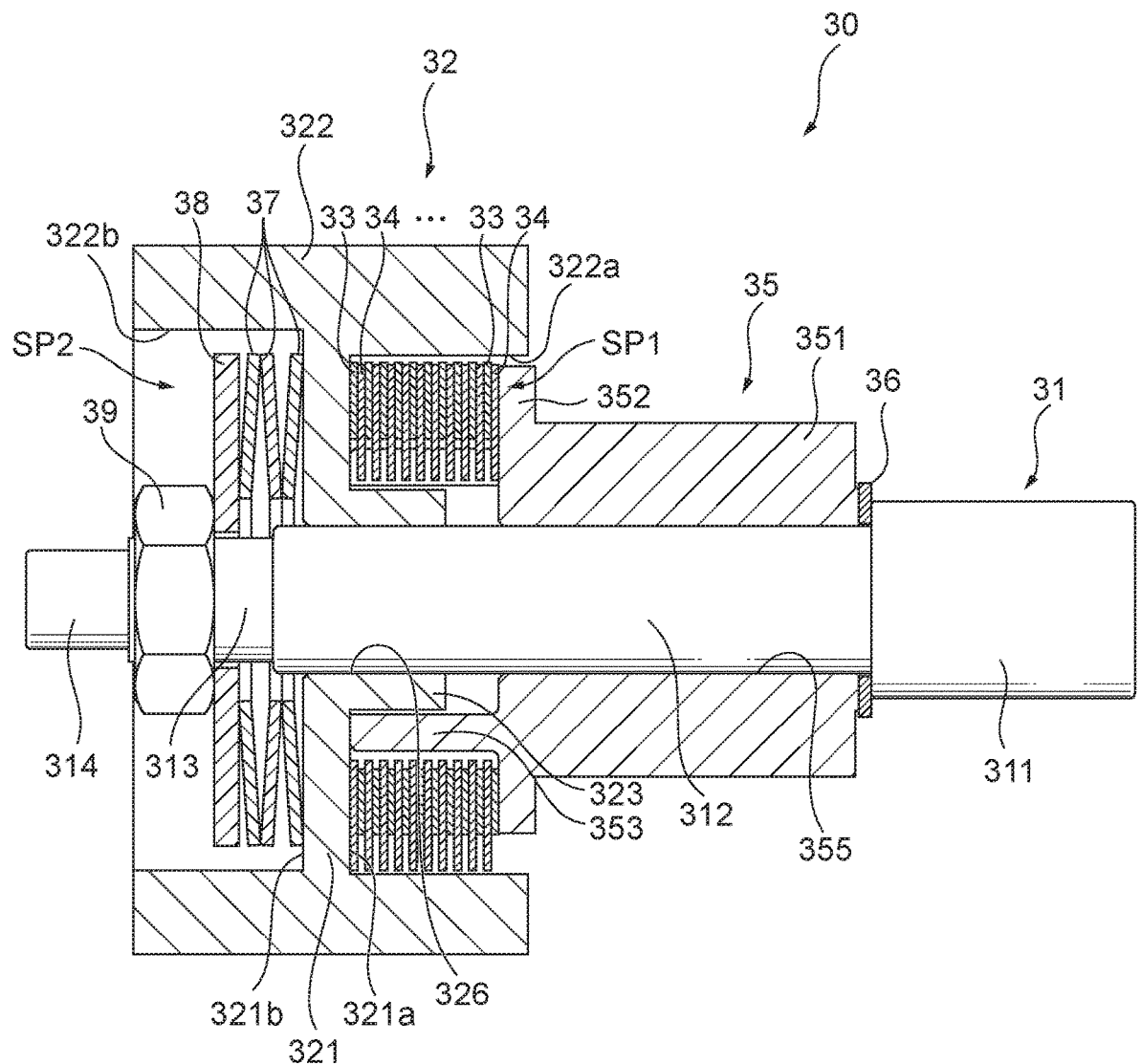
FIG. 4 A cross-sectional view of the torque limiter according to Embodiment 1.

The shaft 31 is formed of metal or the like, and is the center of rotation of the torque limiter 30. As shown in FIG. 4, the shaft 31 is composed of a head portion 311, a columnar portion 312 with an outer diameter smaller than an outer diameter of the head portion 311, a screw portion 313 having an outer diameter smaller than the outer diameter of the columnar portion 312 and a screw to be screwed into the later-described nut 39, and a small-diameter portion 314 with an outer diameter smaller than the outer diameter of the screw portion 313.

The second gear part 32 is a rotary body fixed on the shaft 31 and to be driven by the motor 10 through the gear 11. The second gear part 32 is formed of resin or the like, and has an outer cylindrical portion 322 and a partition portion 321 as shown in FIG. 4. The outer cylindrical portion 322 and the partition portion 321 are, for example, formed integrally. The second gear part 32 is fixed in the rotational direction of the shaft 31, and is movable in the axial direction of the shaft 31.

A second gear 324 is formed on an outer circumferential surface of the outer cylindrical portion 322. The second gear 324 meshes with the gear 11 attached to the output rotary shaft 10a of the motor 10. The second gear 324 may be connected to the gear 11 through a gear train (not shown).

Figure 6:
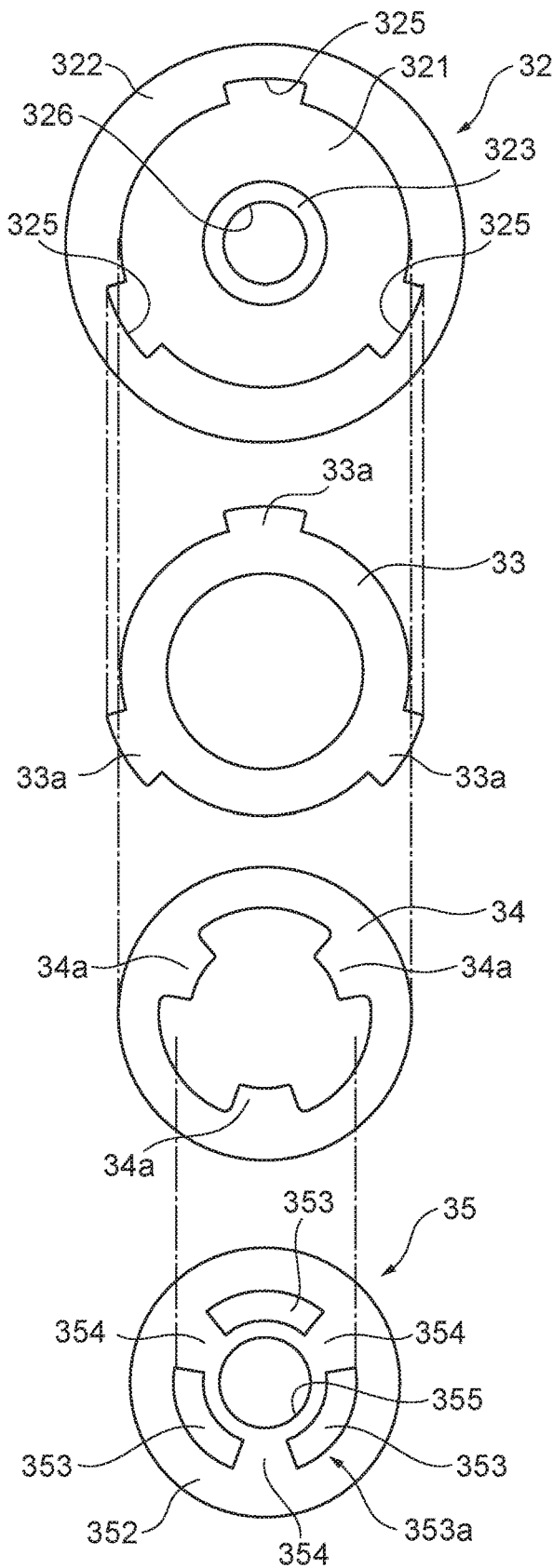
FIG. 6 A diagram showing planar positional relationships among a second gear part, a first friction body, a second friction body, and a third gear part in the torque limiter according to Embodiment 1.

Moreover, as shown in FIG. 6, on the inner circumferential surface of the outer cylindrical portion 322, later-described recessed portions (engaged portions) 325 that engage with projecting portions 33a formed on the outer peripheral portion of the first friction body 33 are formed, for example, in 120° rotational symmetry. Each of the recessed portions 325 is formed on the inner circumferential surface 322a on one main surface 321a side of the partition portion 321. Each of the recessed portions 325 and the projecting portions 33a is formed, for example, in a rectangular shape.

The partition portion 321 is arranged at a substantially central portion of the outer cylindrical portion 322. An inner cylindrical portion 323 in a cylindrical shape is formed integrally with the partition portion 321 in a raised manner at the center of the partition portion 321. Moreover, at the central portion of the partition portion 321, a circular through-hole 326 that communicates with the hole of the inner cylindrical portion 323 and through which the columnar portion 312 of the shaft 31 is inserted is formed.

As shown in FIG. 4, a space inside the second gear part 32 is divided into two by the partition portion 321. That is, the space inside the second gear part 32 is divided into a space formed by the inner circumferential surface 322a of the outer cylindrical portion 322 and the one main surface 321a of the partition portion 321 (hereinafter referred to as the "accommodating part SP1") and a space formed by an inner circumferential surface 322b of the outer cylindrical portion 322 and another main surface 321b of the partition portion 321 (hereinafter referred to as the "accommodating part SP2").

The first friction body 33 is formed of a metal plate (for example, SUS304), or a resin plate or the like, and has an annular shape as shown in FIG. 6. An outer diameter of the first friction body 33 is slightly smaller than an inner diameter of the outer cylindrical portion 322 of the second gear part 32. An inner diameter of the first friction body 33 is slightly larger than an outer diameter of a later-described raised portion 353 formed in the third gear part 35. Further, formed on the outer peripheral edge of the first friction body 33 are the projecting portions (engagement portions) 33a that engage with the three recessed portions 325 formed on the outer cylindrical portion 322 of the second gear part 32.

The second friction body 34 is formed of a metal plate (for example, Beryllium copper), or a resin plate or the like, and has an annular shape as shown in FIG. 6. In order to avoid the contact area between the friction bodies from being insufficient due to the presence of burrs at the edge portions of the friction bodies, the dimensions of the inner diameter and the outer diameter of each of the first friction body 33 and the second friction body 34 may be designed so that the respective edge portions do not overlap each other when the first friction body 33 and the second friction body 34 are stacked.

On an inner circumferential edge of the second friction body 34, protruding portions (engagement portions) 34a that engage with gaps 354 formed between the raised portions 353 formed on the third gear part 35 to be described later are formed, for example, in 120° rotational symmetry.

Figure 5:
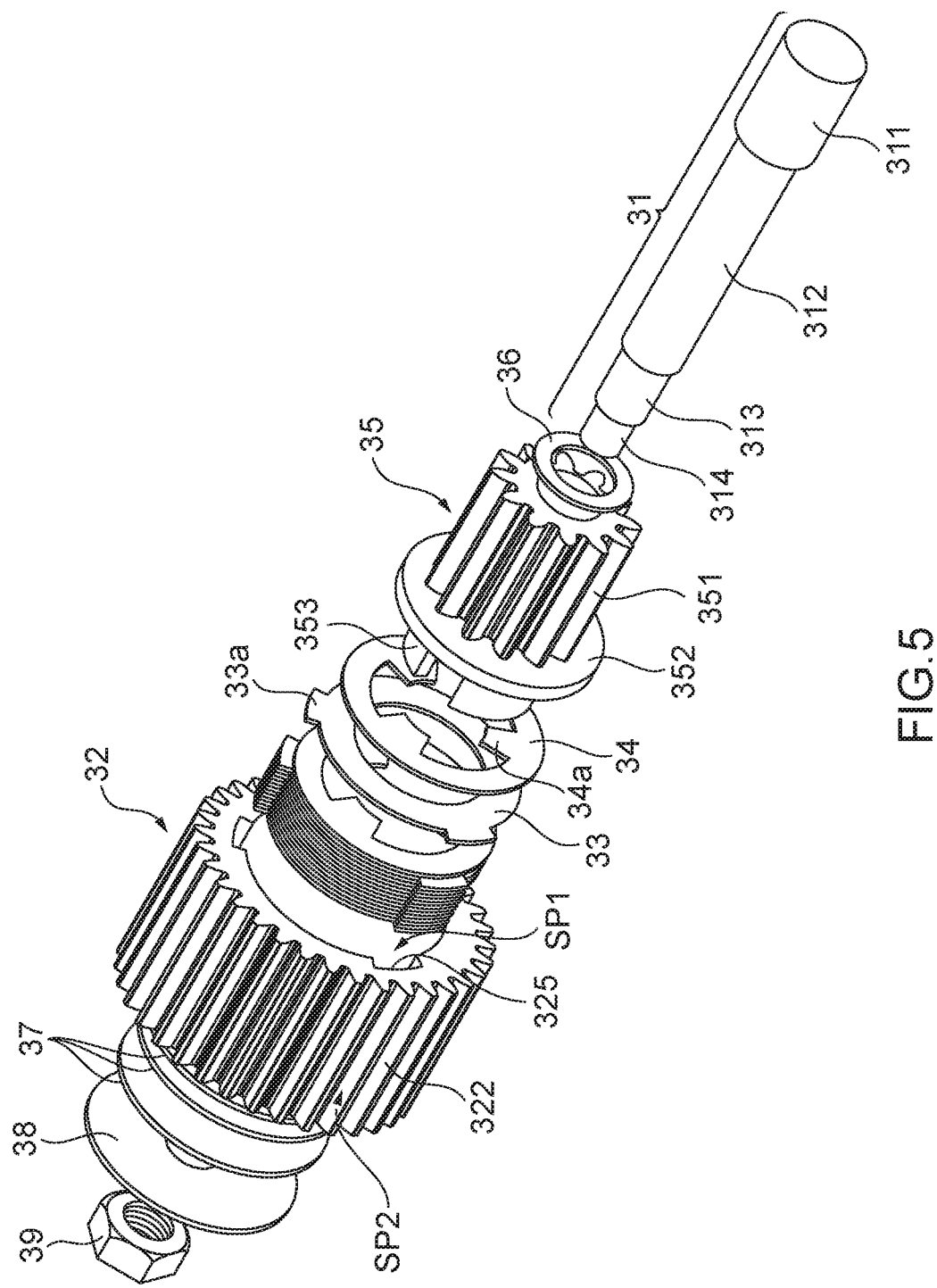
FIG. 5 An exploded cross-sectional view of the torque limiter according to Embodiment 1.

As shown in FIGS. 4 and 5, the first friction bodies 33 and the second friction bodies 34 are stacked alternately and accommodated in the accommodation part SP1 of the second gear part 32. At this time, the projecting portions 33a of the first friction bodies 33 are inserted into the recessed portions 325 formed in the outer cylindrical portion 322 of the second gear part 32.

In the present embodiment, as shown in FIG. 4, etc., an example where ten first friction bodies 33 and ten second friction bodies 34 are stacked is presented, but the number of the first friction bodes 33 and the second friction bodies 34 to be stacked is not particularly limited.

The third gear part 35 is a rotary body rotatably supported by the shaft 31. A portion of the third gear part 35 is arranged on the accommodating part SP1 side of the second gear part 32. The third gear part 35 includes the third gear 351, a disc portion 352, and the raised portion 353. For example, the third gear 351, the disc portion 352 and the raised portion 353 are integrally formed by resin or the like.

The third gear 351 is formed to have a smaller diameter than the second gear part 32 and to stand at the center of the disc portion 352. A gear is formed on the outer circumferential surface of the third gear 351, and the gear meshes with the large-diameter gear 21 of the first gear part 20.

The disc portion 352 is formed with an outer periphery smaller than the inner diameter of the outer cylindrical portion 322 of the second gear part 32, and serves the role as a lid for pressing the first friction body 33 and the second friction body 34 accommodated in the accommodating part SP1 of the second gear part 32.

Moreover, a through-hole 355 with a diameter larger than the outer diameter of the columnar portion 312 of the shaft 31 is formed at the center of rotation of the third gear 351 and the disc portion 352. That is, a clearance is formed between the columnar portion 312 of the shaft 31 and the inner circumferential surfaces of the third gear 351 and the disc portion 352.

The raised portions 353 are provided on a surface of the disc portion 352 opposite to the surface on which the third gear 351 is formed, and extend in the direction of the rotation axis. As shown in FIGS. 4 to 6, the raised portions 353 are formed, for example, in 120° rotational symmetry, and have a substantially cylindrical shape as a whole.

As shown in FIG. 6, an outer diameter of a cylindrical portion 353a formed in a substantially circular shape in plan view by a plurality of the raised portions 353 is smaller than the inner diameter of each of the first friction body 33 and the second friction body 34. Moreover, an inner diameter of the cylindrical portion 353a is formed to be larger than the outer diameter of the columnar portion 312 of the shaft 31. That is, a clearance is formed between the inner circumferential surfaces of the raised portions 353 of the third gear part 35 and the columnar portion 312 of the shaft 31.

Further, the three protruding portions 34a of the second friction body 34 are engaged with three gaps (engaged portions) 354 between the raised portions 353. Therefore, the third gear 351 and the second friction body 34 rotate together.

Figure 3:
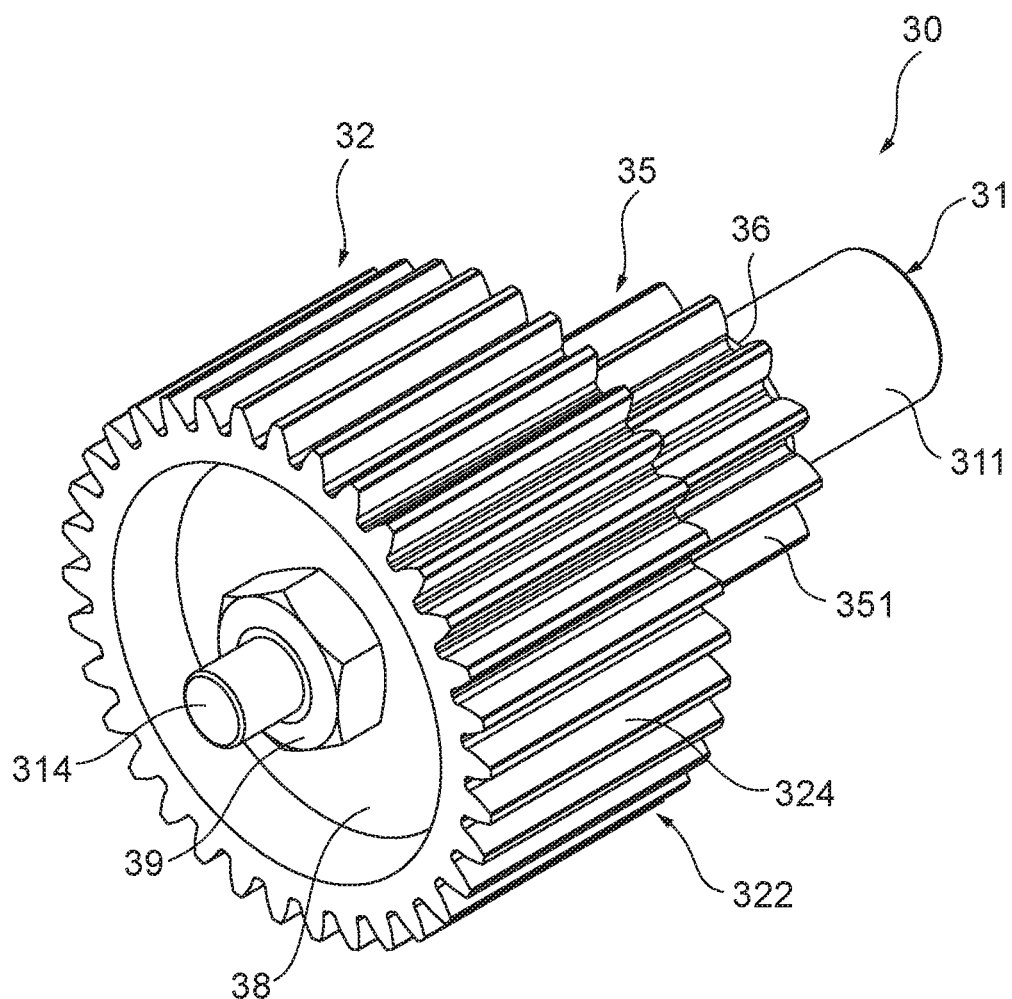
FIG. 3 A perspective view of the torque limiter according to Embodiment 1.

The slide washer 36 is formed of, for example, resin. As shown in FIGS. 3 and 4, the columnar portion 312 of the shaft 31 is inserted through the hollow portion of the slide washer 36, and the slide washer 36 is arranged in contact with an axial end surface of the third gear 351. Specifically, the slide washer 36 is arranged in a step portion between the head portion 311 and the columnar portion 312 of the shaft 31, and is held between the axial end surface of the third gear 351 and the head portion 311 of the shaft 31.

The disc spring 37 is a part for biasing the first friction body 33 and the second friction body 34 toward the head portion 311 in the stacking direction of the first friction body 33 and the second friction body 34. As shown in FIGS. 4 and 5, the disc springs 37 are placed in the accommodating part SP2 of the second gear part 32. For example, in the accommodating part SP2 of the second gear part 32, the shaft 31 is inserted into the hollow portion of each of the disc springs 37, and the disc spring 37 is arranged in contact with the main surface 321b of the partition portion 321. In the present embodiment, an example where three disc springs 37 are stacked and arranged in the accommodating part SP2 is shown, but at least one disc spring 37 is necessary, and the number of the disc springs 37 is not particularly limited.

The washer 38 is formed of, for example, metal. As shown in FIGS. 3 and 4, the screw portion 313 of the shaft 31 is inserted into the hollow portion of the washer 38, and the washer 38 is arranged to face the main surface 321b of the partition portion 321 of the second gear part 32 with the disc springs 37 between the washer 38 and the main surface 321b.

The nut 39 is a fastening member that applies a compressive force to the disc spring 37. As shown in FIGS. 3 and 4, in a state in which the small-diameter portion 314 of the shaft 31 protrudes from the through-hole 326 of the partition portion 321 of the second gear part 32 and the hollow portion of the washer 38, the nut 39 and the screw portion 313 of the shaft 31 are screwed to press and fix the disc spring 37 against the second gear part 32 through the washer 38. Consequently, a compressive force is applied to the disc spring 37. At this time, the third gear part 35, which is pressed against the head portion 311 side of the shaft 31 through the disc spring 37, the second gear part 32, the first friction body 33 and the second friction body 34, is stopped being pressed at the step portion between the head portion 311 and the columnar portion 312 through the slide washer 36.

By adjusting the tightening degree of the nut 39, it is possible to adjust the force of the disc spring 37 pressing the first friction body 33 and the second friction body 34 toward the third gear part 35 through the second gear part 32.

Next, a method of assembling the torque limiter 30 having the above configuration will be described with reference to FIG. 5.

First, ten first friction bodies 33 and ten second friction bodies 34 are alternately aligned and stacked on the main surface 321a of the partition portion 321 of the second gear part 32 and accommodated in the accommodating part SP1 of the second gear part 32. At this time, the projecting portions 33a of the first friction body 33 are engaged with the recessed portions 325 formed in the outer cylindrical portion 322 of the second gear part 32. Moreover, grease is filled as needed. In order to obtain a stable friction force, a resin sheet or the like may be arranged between the first friction body 33 and the second friction body 34 in addition to grease.

Next, the third gear part 35 is placed in the accommodating part SP1 of the second gear part 32. At this time, the three protruding portions 34a of the second friction body 34 are engaged with the gaps 354 between the three raised portions 353 of the third gear part 35, respectively.

Next, in a state in which the shaft 31 is inserted through the through-hole 355 of the third gear part 35, the columnar portion 312 of the shaft 31 is inserted through the through-hole 326 of the partition portion 321 of the second gear part 32.

Next, the three disc springs 37 and the washer 38 are inserted in this order from the small-diameter portion 314 side so that the shaft 31 penetrates therethrough, and the nut 39 and the screw portion 313 of the shaft 31 are screwed, thereby accommodating the disc springs 37 and the washer 38 in the accommodating part SP2 of the second gear part 32. At this time, by adjusting the tightening degree of the nut 39, the pressing force that the disc springs 37 apply to the first friction body 33 and the second friction body 34 through the second gear part 32 is adjusted.

With the above assembling method, the torque limiter 30 according to Embodiment 1 can be realized.

Next, an operation of the drive device 1 incorporating the torque limiter according to Embodiment 1 will be described.

The drive device 1 incorporating the torque limiter 30 is incorporated into the apparatus 2 shown in FIG. 1 in the following state. That is, the second gear 324 of the torque limiter 30 is meshed with the gear 11 fitted on the output rotary shaft 10a of the motor 10 in the hinge part 3 of the apparatus 2. Moreover, the small-diameter gear 22 of the first gear part 20 connected to the third gear 351 of the torque limiter 30 is directly or indirectly connected to a gear (not shown) connected to the rotation shaft of the movable part 5 as a drive target. In this state, the drive device 1 is incorporated into the apparatus 2.

Here, a case where the movable part 5 as the drive target is to be opened, that is, the case where the movable part 5 is to be driven in a direction indicated by reference symbol A in FIG. 1 will be described.

In this case, a controller (not shown) supplies a drive signal to the motor 10 and rotates the motor 10 in one direction. With the rotation of the motor 10, the gear 11 fitted on the output rotary shaft 10a of the motor 10 rotates, and the second gear 324 meshing with the gear 11 rotates.

With the rotation of the second gear 324, the first friction body 33 having the projecting portions 33a engaged with the recessed portions 325 of the second gear part 32 rotates. The rotational force of the first friction body 33 is transmitted to the second friction body 34 by a static friction force between the first friction body 33 and the second friction body 34, and the second friction body 34 rotates. With the rotation of the second friction body 34, the raised portions 353 of the third gear part 35 engaged with the second friction body 34 rotate, and the third gear 351 that is formed integrally with the raised portions 353 also rotates with the rotation of the raised portions 353. With the rotation of the third gear 351, the large-diameter gear 21 of the first gear part 20 meshing with the third gear 351 rotates, and the small-diameter gear 22 that is integrally formed with the large-diameter gear 21 rotates with the rotation of the large-diameter gear 21. The rotation of the small-diameter gear 22 is transmitted to the rotation shaft of the movable part 5, and the movable part 5 is opened.

On the other hand, in a case where the movable part 5 as the drive target is to be closed, that is, the case where the movable part 5 is to be driven in a direction indicated by reference symbol B in FIG. 1, the above controller rotates the motor 10 in the opposite direction. Consequently, the rotational force in the opposite direction to the above-mentioned direction is transmitted to the rotation shaft of the movable part 5, and the movable part 5 is closed.

Next, a case where a user of the apparatus 2 performs a manual operation of closing and opening the movable part 5 and applies an overload to the movable part 5 will be described.

In this case, as the rotation shaft of the movable part 5 rotates, the first gear part 20 rotates, and the third gear 351 meshing with the first gear part 20 rotates. Further, the raised portions 353 formed integrally with the third gear 351 rotate, and the second friction body 34 engaged with the raised portions 353 rotates.

At this time, if the overload applied to the movable part 5 exceeds the limit torque, that is, if the overload applied to the movable part 5 exceeds the maximum static friction force between the first friction body 33 and the second friction body 34, the second friction body 34 slips with respect to the first friction body 33, and the rotation of the third gear part 35 is not transmitted to the second gear part 32 and the motor 10 after the first friction body 33.

Thus, if the overload applied to the movable part 5 exceeds the maximum static friction force between the first friction body 33 and the second friction body 34, since the rotation of the third gear part 35 is not transmitted to the second gear part 32, it is possible to protect the motor 10, the gear 11 and the second gear part 32.

In addition, even if the overload exceeding the limit torque is transmitted from the motor 10 side to the second gear part 32 for some reason, the first friction body 33 slips with respect to the second friction body 34 and therefore the overload is not transmitted to the third gear part 35, and the third gear part 35, the first gear part 20, etc. can be protected.

As described above, according to the torque limiter 30 of Embodiment 1, the torque generated by the motor 10 can be transmitted to the first gear part 20 by the friction force between the first friction body 33 and the second friction body 34, but, if an excessive overload is applied from the outside, the first friction body 33 and the second friction body 34 slip, and therefore it is possible to limit the transmission of torque applied to the motor 10 from the outside.

Moreover, according to the torque limiter 30, since the disc spring 37 is used as means for biasing the first friction body 33 and the second friction body 34, it is possible to reduce the thickness and downsize the torque limiter compared to the case where other biasing means such as a coil spring is used.

Further, according to the torque limiter 30, since the nut 39 as the fastening member fixes the disc spring 37 to the second gear part 32 as the first rotary body without contacting the third gear part 35 as the second rotary body, it is possible to reduce fluctuation in the slip torque value of the torque limiter. Hereinafter, this point will be described in detail.

As described above, the slip torque value of the torque limiter 30, that is, the maximum static friction force between the first friction body 33 and the second friction body 34 is adjusted by the tightening degree of the nut 39. Therefore, if the tightening degree of the nut 39 is changed for some reason, the slip torque value of the torque limiter 30 may change.

For example, supposing that the tightening position of the nut 39 is the third gear part 35 side. Let's consider a case where an external force is applied to the third gear part 35 side in a state in which the nut 39 is fixed in contact with the third gear part 35, and the second friction body 34 slips with respect to the first friction body 33. In this case, no torque is transmitted to the second gear 324 connected to the first friction body 33 and the gear 11 connected to the output rotary shaft 10a of the motor 10, but the torque from the external force is applied to the third gear part 35, and the third gear part 35 rotates. At this time, with the rotation of the third gear part 35, a positional shift of the nut 39 in contact with the third gear part 35 occurs, and the tightening degree of the nut 39 changes.

On the other hand, according to the torque limiter 30 of Embodiment 1, a compressive force is applied to the disc spring 37 by fixing the nut 39 at a position where the nut 39 does not rotate relative to the third gear part 35 which rotates when the second friction body 34 slips with respect to the first friction body 33, that is, at a position where the nut 39 does not contact the third gear part 35.

Accordingly, since the rotational force of the third gear part 35 when the second friction body 34 slips with respect to the first friction body 33 is unlikely transmitted to the nut 39, it is possible to reduce the fluctuation in the slip torque value resulting from the positional shift of the nut 39 and improve the stability of the slip torque value.

In particular, in the torque limiter 30 according to Embodiment 1, the second gear part 32 and the third gear part 35 are arranged to have the same rotation axis, and the first friction body 33 and the second friction body 34 are stacked between the second gear part 32 and the third gear part 35 on the rotation axis. Further, in the torque limiter 30, the disc spring 37 which is arranged coaxially with the second gear part 32 is pressed and fixed against the second gear part 32 by the nut 39. Thus, the nut 39 can be tightened at a position physically separated from the third gear part 35. Consequently, since the fluctuation in the slip torque value can be more effectively reduced, it is possible to further improve the stability of the slip torque value.

Embodiment 2

Figure 7:
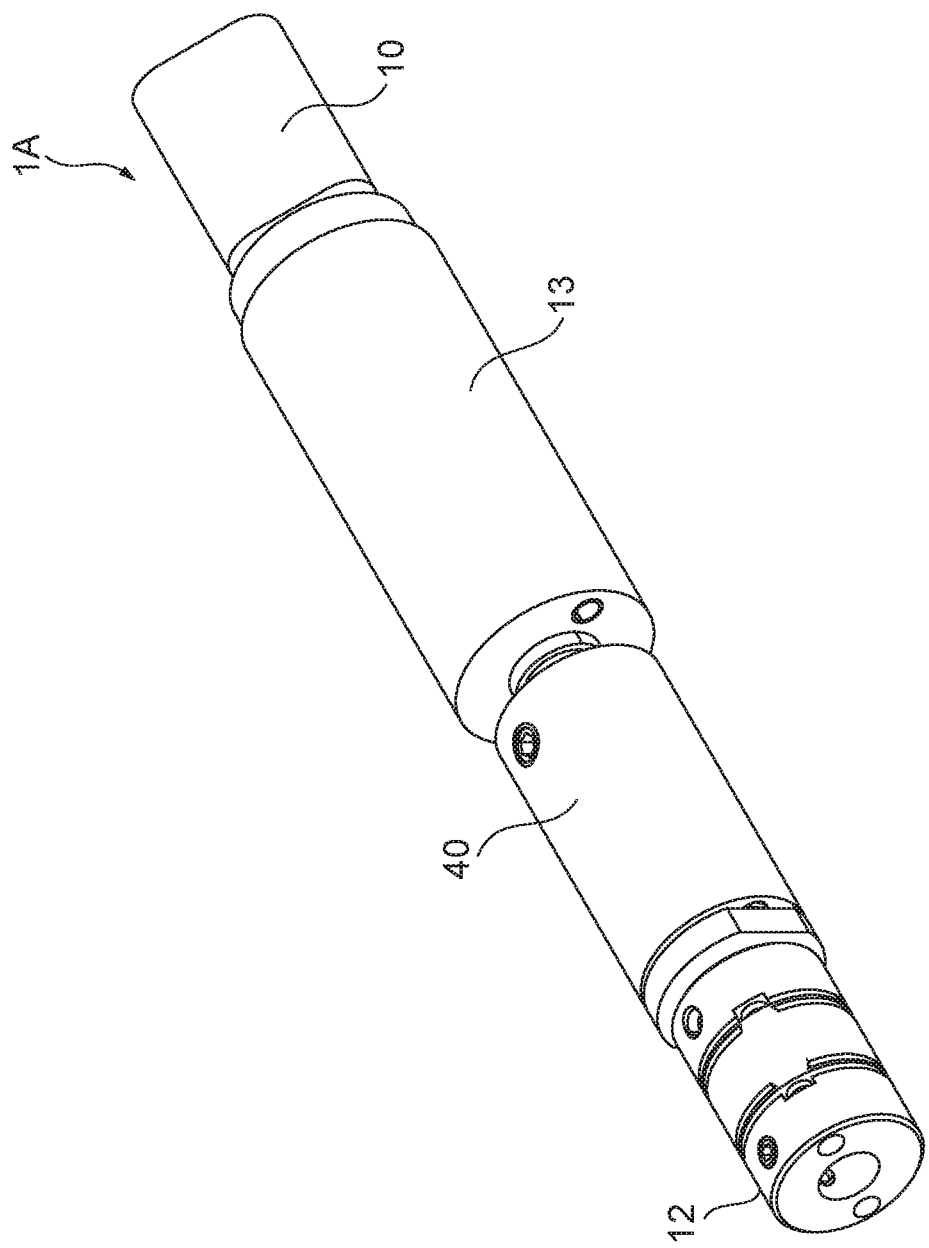
FIG. 7 A perspective view of a drive device including a torque limiter according to Embodiment 2.

FIG. 7 is a perspective view of a drive device including a torque limiter according to Embodiment 2.

Similarly to the drive device 1 according to Embodiment 1, by accommodating a drive device 1A shown in FIG. 7 in the hinge part 3 of the apparatus 2 including the movable part 5 shown in FIG. 1, the drive device 1A drives the movable part 5 to open and close.

As shown in FIG. 7, the drive device 1A includes the motor 10, a speed reducer 13, a torque limiter 40, and a coupling 12.

The speed reducer 13 is a part that reduces the speed of a rotational force generated by the motor 10 and transmits the rotational force to the rotation shaft (opening and closing drive shaft) of the movable part 5. The speed reducer 13 transmits the torque transmitted from the motor 10 through the torque limiter 40 and the coupling 12 to the movable part 5 as a drive target. The speed reducer 13 is, for example, composed of a gear mechanism including a planetary gear.

The motor 10 and the speed reducer 13 function as a drive part that drives a later-described case 41 of the torque limiter 40.

The torque limiter 40 transmits the rotational force of the motor 10 input from the speed reducer 13 to the movable part 5 through the coupling 12, but if the torque greater than the slip torque value is applied, the torque limiter 40 limits the torque to be transmitted between the movable part 5 and the motor 10.

The coupling 12 is a functional part that connects a later-described shaft 42 of the torque limiter 40 and the rotation shaft (opening and closing drive shaft) of the movable part 5, and transmits the rotational force of the shaft 42 to the rotation shaft of the movable part 5. The coupling 12 functions as a later-described transmission part that transmits the rotation of the shaft 42 of the torque limiter 40 to the movable part 5 as the drive target.

Hereinafter, the configuration of the torque limiter 40 will be described using FIGS. 8 to 10.

Figure 8:
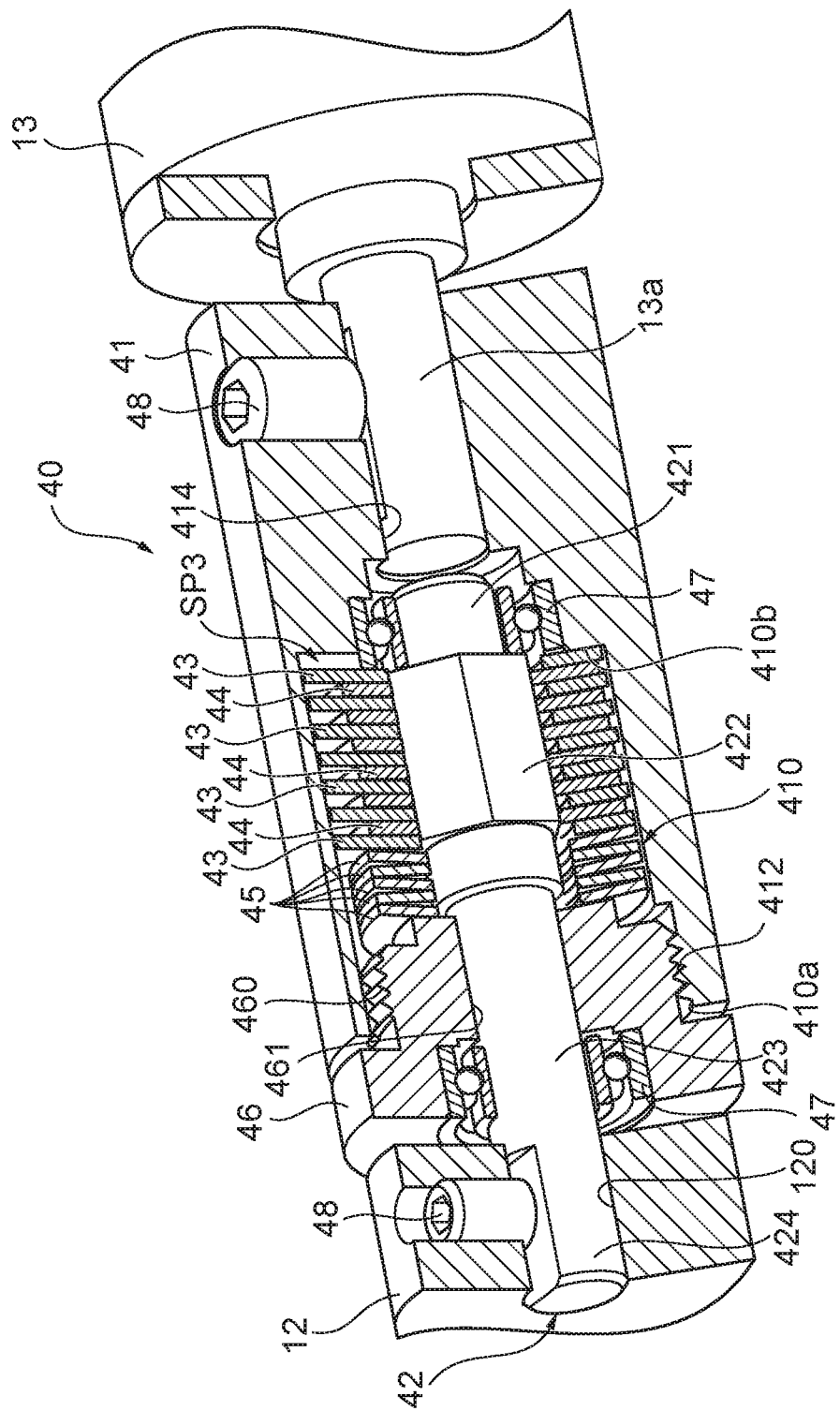
FIG. 8 A cross-sectional view of the torque limiter according to Embodiment 2.
Figure 9:
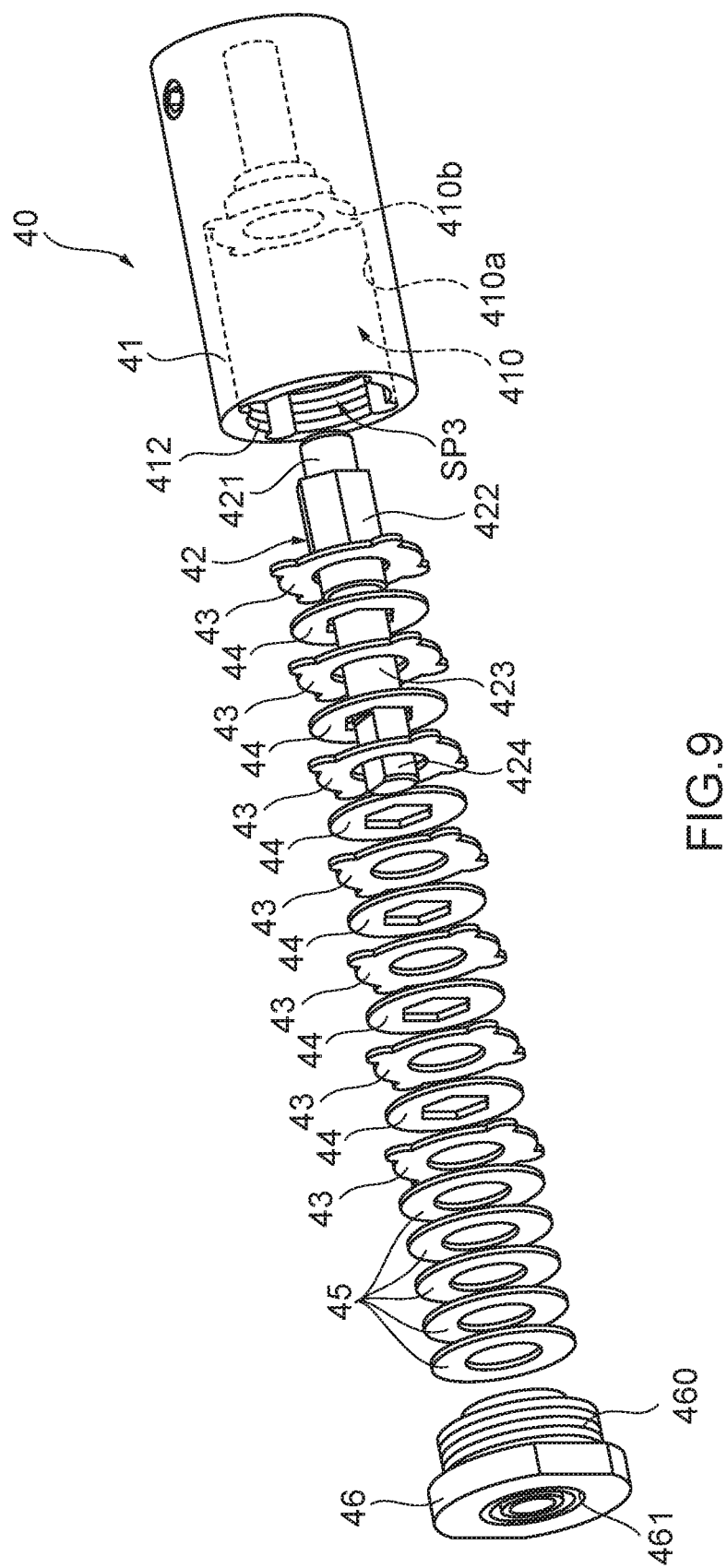
FIG. 9 An exploded cross-sectional view of the torque limiter according to Embodiment 2.
Figure 10:
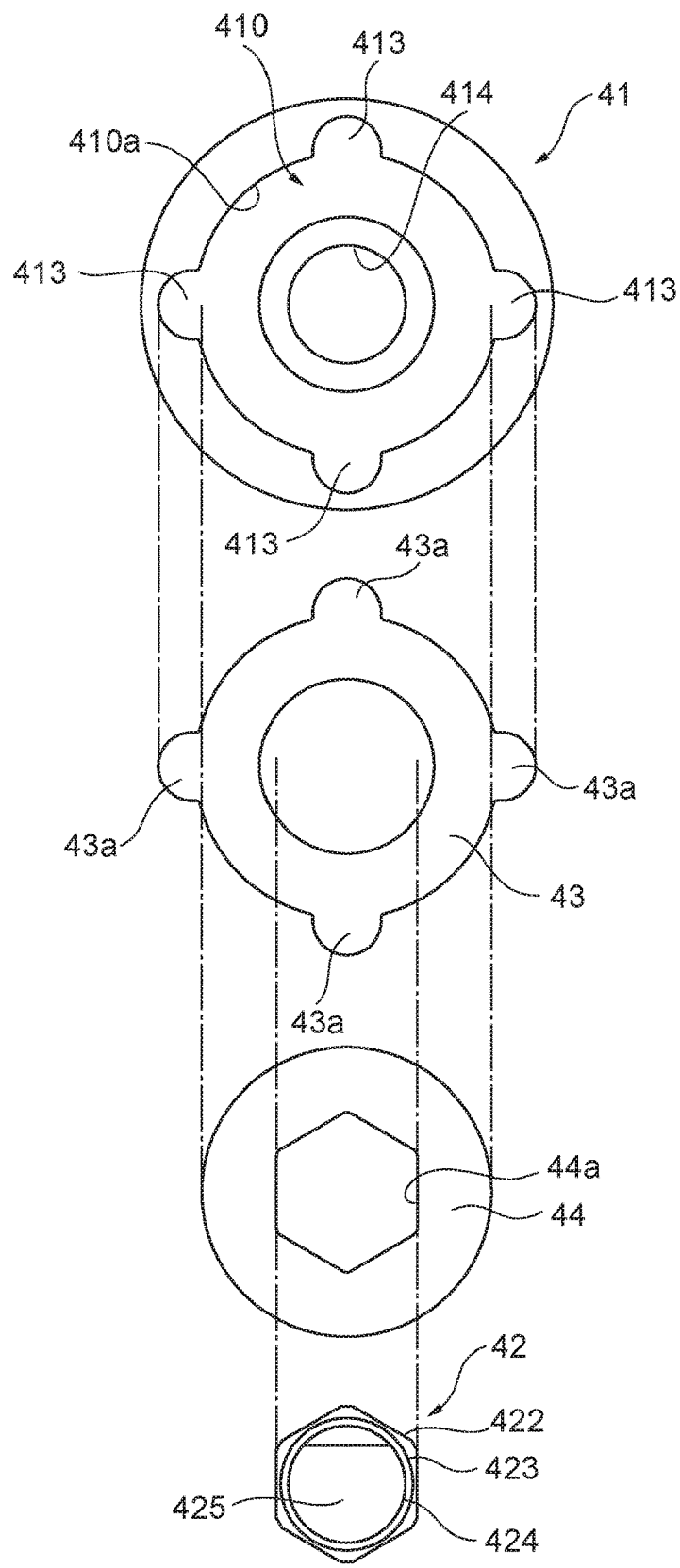
FIG. 10 A diagram showing planar positional relationships among a case, a first friction body, a second friction body, and a shaft in the torque limiter according to Embodiment 2.

As shown in FIGS. 8 to 10, the torque limiter 40 includes the case 41 as the first rotary body, a first friction body 43, a second friction body 44, a disc spring 45, a fastening member 46, the shaft 42 as the second rotary body, and a bearing 47.

The case 41 is formed of resin, metal or the like, and is a container for accommodating the first friction body 43, the second friction body 44 and the disc spring 45, and is also a rotary body that is connected to an output shaft 13a of the speed reducer 13 and receives the rotational force of the motor 10 input through the output shaft 13a to rotate.

The case 41 has a cylindrical shape with a bottomed hole 410 formed in the direction of the rotation axis. On the opening side of an inner circumferential surface 410a of the case 41 where the hole 410 is formed, a threaded first screw portion 412 is formed.

Moreover, as shown in FIG. 10, recessed portions (engaged portions) 413 that engage with later-described projecting portions 43a formed on an outer peripheral portion of the first friction body 43 are formed, for example, in 90° rotational symmetry on the inner circumferential surface 410a of the case 41. Each of the recessed portions 413 and the projecting portions 43a is formed, for example, in a circular arc shape.

Moreover, a hole 414 is formed on an end surface opposite to an end surface of the case 41 where the hole 410 is formed. As shown in FIG. 8, the output shaft 13a of the speed reducer 13 is fitted into the hole 414, and is fixed to the case 41 by a fastening tool 48 such as a screw.

The first friction body 43, the second friction body 44 and the disc spring 45 are accommodated in a space formed by the hole 410 of the case 41 (hereinafter referred to as the "accommodating part SP3").

The first friction body 43 is formed of a metal plate (for example, SUS304), or a resin plate or the like, and has an annular shape as shown in FIG. 10. An outer diameter of the first friction body 43 is slightly smaller than an inner diameter of the hole 410 of the case 41. An inner diameter of the first friction body 43 is formed to be larger than an outer diameter of a later-described fixing portion 422 of the shaft 42. Further, formed on an outer peripheral edge of the first friction body 43 are projecting portions (engagement portions) 43a that engage with three recessed portions 413 formed on the inner circumferential surface 410a of the case 41.

The second friction body 44 is formed of a metal plate (for example, Beryllium copper), or a resin plate or the like, and is formed in a disc shape as shown in FIG. 10, and a polygonal (for example, hexagonal) opening 44a into which the fixing portion 422 having a polygonal (for example, hexagonal) cross section of the shaft 42 is to be inserted is formed at the center.

As shown in FIGS. 8 and 9, the first friction bodies 43 and the second friction bodies 44 are stacked alternately on a bottom surface 410b of the hole 410 and accommodated in the accommodating part SP3 of the case 41. At this time, the projecting portions 43a of the first friction body 43 are inserted into the recessed portions 413 formed on the inner circumferential surface 410a of the case 41.

In the present embodiment, as shown in FIG. 9, etc., an example where seven first friction bodies 43 and six second friction bodies 44 are stacked is presented, but the number of the first friction bodies 43 and the second friction bodies 44 is not particularly limited.

The disc spring 45 is arranged coaxially with the rotation axis of the case 41 and in contact with at least one of the first friction body 43 and the second friction body 44 in the accommodating part SP3 of the case 41. Specifically, as shown in FIGS. 8 and 9, at least one disc spring 45 is stacked on a side of the stack of the first friction bodies 43 and the second friction bodies 44, the side being not in contact with the bottom surface 410b.

In the present embodiment, as shown in FIG. 9, etc., an example where five disc springs 45 are stacked is presented, but the number of the disc springs 45 is not particularly limited.

The shaft 42 has a D-shaped portion 424 with a D-shaped cross section to be connected to a rotation axis (hole 120) of the coupling 12, a columnar portion 423, the fixing portion 422 having a polygonal (for example, hexagonal) cross section to which the opening 44a of the second friction body 44 is fixed, and a tip portion 421.

The shaft 42 is inserted through the hole 410 of the case 41 while penetrating the disc springs 45, the first friction bodies 43 and the second friction bodies 44, and is pivotally supported by the bearing (for example, ball bearing) 47 arranged on the bottom surface 410b side of the hole 410 of the case 41. The D-shaped portion 424 of the shaft 42 is fitted into the hole 120 formed at one end of the coupling 12, and is fixed to the coupling 12 by the fastening tool 48 such as a screw.

The fastening member 46 is a functional member that applies a compressive force to the disc spring 45. The fastening member 46 is formed of, for example, the same material as the case 41, and has a second screw portion 460 corresponding to the first screw portion 412 of the case 41, and a through-hole 461 formed through the rotation axis of the fastening member 46.

The fastening member 46 is fixed to the case 41 by screwing the second screw portion 460 and the first screw portion 412 of the case 41 while pressing the disc springs 45, the first friction bodies 43, and the second friction bodies 44 against the bottom surface 410b of the hole 410 of the case 41.

The shaft 42 is inserted through the through-hole 461 of the fastening member 46, and the columnar portion 423 of the shaft 42 is pivotally supported by the bearing 47 arranged in the through-hole 461.

At this time, a clearance is formed between the through-hole 461 of the fastening member 46 and the shaft 42 (for example, the columnar portion 423). That is, the fastening member 46 and the shaft 42 are not in contact with each other.

Next, a method of assembling the torque limiter 40 having the above configuration will be described with reference to FIG. 9.

First, the tip portion 421 of the shaft 42 is fitted into the bearing 47 arranged on the bottom surface 410b side of the hole 410 of the case 41.

Next, seven first friction bodies 43 and six second friction bodies 44 are alternately aligned and stacked on the bottom surface 41b of the hole 410 of the case 41 and accommodated in the accommodating part SP3 of the case 41. At this time, the projecting portions 43a of the first friction body 43 are engaged with the recessed portions 413 formed on the inner circumferential surface 410a of the case 41, and the opening 44a of the second friction body 44 is also fitted on the fixing portion 422 of the shaft 42. Moreover, grease is filled as needed. In order to obtain a stable friction force, a resin sheet or the like may be arranged between the first friction body 43 and the second friction body 44 in addition to grease.

Next, five disc springs 45 are stacked on the stack of the first friction bodies 43 and the second friction bodies 44 by inserting the shaft 42 through five disc springs 45 from the D-shaped portion 424 side.

Next, in a state in which the shaft 42 is inserted through the through-hole 461 of the fastening member 46 and the columnar portion 423 of the shaft 42 is fitted into the bearing 47 arranged in the through-hole 461 of the fastening member 46, the second screw portion 460 of the fastening member 46 is screwed into the first screw portion 412 formed on the inner circumferential surface 410a of the case 41. Consequently, a compressive force is applied to the disc springs 45 from the fastening member 46. At this time, by adjusting the tightening degree of the fastening member 46, the pressing force that the disc springs 45 apply to the first friction bodies 43 and the second friction bodies 44 is adjusted.

With the above assembling method, the torque limiter 40 according to Embodiment 2 can be realized.

Next, an operation of the drive device 1A incorporating the torque limiter 40 according to Embodiment 2 will be described.

The drive device 1A incorporating the torque limiter 40 is incorporated into the apparatus 2 shown in FIG. 1 in the following state. That is, in the hinge part 3 of the apparatus 2, the output shaft 13a of the speed reducer 13 that rotates by receiving the rotational force from the output shaft of the motor 10 is fitted and fixed in the hole 414 of the case 41 of the torque limiter 40. Further, the D-shaped portion 424 of the shaft 42 protruding from the fastening member 46 of the torque limiter 40 is inserted and fixed to the hole 120 formed at one end of the coupling 12, and also the rotation shaft of the movable part 5 is fitted and fixed in a hole (not shown) formed at the other end of the coupling 12. In this state, the drive device 1A is incorporated into the apparatus 2.

Here, a case where the movable part 5 as the drive target is to be opened, that is, the case where the movable part 5 is to be driven in the direction indicated by reference symbol A in FIG. 1 will be described.

In this case, a controller (not shown) supplies a drive signal to the motor 10 and rotates the motor 10 in one direction. With the rotation of the motor 10, the output shaft 13a of the speed reducer 13 fitted on the output rotary shaft of the motor 10 rotates, and the case 41 into which the output shaft 13a is fitted rotates.

With the rotation of the case 41, the first friction body 43 having the projecting portions 43a engaged with the recessed portions 413 formed on the inner circumferential surface 410a of the case 41 rotates. The rotational force of the first friction body 43 is transmitted to the second friction body 44 by a static friction force between the first friction body 43 and the second friction body 44, and the second friction body 44 rotates. With the rotation of the second friction body 44, the shaft 42 fitted in the second friction body 44 in the fixing portion 422 rotates. With the rotation of the shaft 42, the coupling 12 fitted on the D-shaped portion 424 of the shaft 42 rotates. Then, the rotation of the coupling 12 is transmitted to the rotation shaft of the movable part 5, and the movable part 5 is opened.

On the other hand, in a case where the movable part 5 as the drive target is to be closed, that is, the case where the movable part 5 is to be driven in the direction indicated by reference symbol B in FIG. 1, the above controller rotates the motor 10 in the opposite direction. Consequently, the rotational force in the opposite direction to the above-mentioned direction is transmitted to the rotation shaft of the movable part 5, and the movable part 5 is closed.

Next, a case where a user of the apparatus 2 performs a manual operation of closing and opening the movable part 5 and applies an overload to the movable part 5 will be described.

In this case, with the rotation of the rotation shaft of the movable part 5, the coupling 12 rotates, and the shaft 42 fitted in the hole 120 of the coupling 12 rotates. Consequently, the second friction body 44 fitted on the fixing portion 422 of the shaft 42 rotates.

At this time, if the overload applied to the movable part 5 exceeds the limit torque, that is, if the overload applied to the movable part 5 exceeds the maximum static friction force between the first friction body 43 and the second friction body 44, the second friction body 44 slips with respect to the first friction body 43, and the rotation of the shaft 42 is not transmitted to the case 41 and the motor 10 after the first friction body 43.

Thus, if the overload applied to the movable part 5 exceeds the maximum static friction force between the first friction body 43 and the second friction body 44, it is possible to protect the motor 10 and the case 41.

In addition, even if the overload exceeding the limit torque is transmitted from the motor 10 side to the case 41 for some reason, the first friction body 43 slips with respect to the second friction body 44 and therefore the overload is not transmitted to the shaft 42, and the shaft 42, the coupling 12, etc. can be protected.

As described above, according to the torque limiter 40 of Embodiment 2, similarly to the torque limiter 30 of Embodiment 1, the torque generated by the motor 10 can be transmitted to the coupling 12 by the friction between the first friction body 43 and the second friction body 44, but, if an excessive overload is applied from the outside, it is possible to limit the torque to be applied to the motor 10.

Moreover, according to the torque limiter 40, similarly to the torque limiter 30 of Embodiment 1, since the disc spring 45 is used as biasing means for biasing the first friction body 43 and the second friction body 44, it is possible to realize a smaller torque limiter.

In particular, according to the torque limiter 40 of Embodiment 2, in a state in which the disc spring 45, the first friction body 43 and the second friction body 44 are pressed against the bottom surface 410b of the hole 410 of the case 41, the fastening member 46 is fixed to the case 41 by screwing the second screw portion 460 of the fastening member 46 and the first screw portion 412 formed in the inner circumferential surface 410a of the case 41. Therefore, since a lid for pressing the first friction body 43 and the second friction body 44 against the bottom surface 410b of the hole 410 of the case 41 and a fastening tool such as a nut for fastening the lid are not necessarily prepared separately, it is possible to reduce the number of parts and realize a smaller torque limiter.

Further, according to the torque limiter 40, since the clearance is formed between the fastening member 46 as means for adjusting the slip torque value of the torque limiter and the shaft 42 as the second rotary body, the disc spring 45 can be fixed to the case 41 as the first rotary body without making the fastening member 46 contact the shaft 42. Consequently, similarly to the torque limiter 30 according to Embodiment 1, it is possible to reduce the fluctuation in the slip torque value of the torque limiter and improve the stability of the slip torque value.

Extended Embodiment

The invention made by the present inventors has been described specifically based on the embodiments, but it is needless to say that the present invention is not limited to the embodiments, and various modifications can be made without departing from the gist of the invention.

For example, in Embodiment 1, although the case where the disc spring 37 is placed in the accommodating part SP2 is presented as an example, the present invention is not limited to this. For example, the disc spring 37 may be placed in the accommodating part SP1 and stacked together with the first friction body 33 and the second friction body 34. Consequently, similarly to the torque limiter 30 according to Embodiment 1 described above, it is possible to apply a pressing force to the first friction body 33 and the second friction body 34.

In Embodiment 2, an example where the disc spring 45 is arranged on the fastening member 46 side is presented, but the present invention is not limited to this. For example, the disc spring 45 may be arranged between the bottom surface 410b of the hole 410 of the case 41 and the first friction body 43 and the second friction body 44, or on both sides of the stack of the first friction bodies 43 and the second friction bodies 44. Consequently, similarly to the above-described torque limiter 40 of Embodiment 2, it is possible to apply a pressing force to the first friction body 43 and the second friction body 44.

Embodiment 1 describes as an example case where each of the recessed portions 325 of the second gear part 32 and the projecting portions 33a of the first friction body 33 is formed in a rectangular shape, and Embodiment 2 describes as an example case where each of the recessed portions 413 formed on the inner circumferential surface 410a of the case 41 and the projecting portions 43a of the first friction body 43 is formed in an circular arc shape, but the present invention is not limited to these examples. As long as the first friction body 33 can be engaged with the second gear part 32 and the first friction body 43 can be engaged with the case 41, it is possible to employ various shapes.

Regarding this point, the same can be said for the shape of the gap 354 between the raised portions 353 of the third gear part 35 and the shape of the protruding portion 34a of the second friction body 34 in Embodiment 1, and the shape of the fixing portion 422 of the shaft 42 and the shape of the opening 44a of the second friction body 44 in Embodiment 2.

LIST OF REFERENCE SIGNS 1,1A drive device,
2 apparatus,
3 hinge part,
4 apparatus main body,
5 movable part,
10 motor,
10a output rotary shaft of motor,
11 gear,
12 coupling,
13 speed reducer,
13a output shaft of speed reducer,
20 first gear part,
21 large-diameter gear,
22 small-diameter gear,
30, 40 torque limiters,
31 shaft,
32 second gear part,
33 first friction body,
34 second friction body,
33a projecting portion,
34a protruding portion,
35 third gear part,
36 slide washer,
37,45 disc spring,
38 washer,
39 nut,
41 case,
42 shaft,
43 first friction body,
44 second friction body,
44a opening,
46 fastening member,
47 bearing,
48 screw,
311 head portion,
312 columnar portion,
313 screw portion,
314 small-diameter portion,
321 partition portion,
321a, 321b main surfaces of partition portion 321,
322 outer cylindrical portion,
322a, 322b inner circumferential surface of outer cylindrical portion,
323 inner cylindrical portion,
325 recessed portion,
326 through-hole,
351 third gear,
352 disc portion,
353 raised portion,
354 gap,
355 through-hole,
410, 414 holes,
410a inner circumferential surface of case 41,
410b bottom surface,
412 first screw portion,
413 recessed portion,
421 tip portion,
422 fixing portion,
423 columnar portion,
424 D-shaped portion,
460 second screw portion,
461 through-hole,
SP1, SP2, SP3 accommodating parts.

The invention claimed is:

1. A torque limiter comprising:
a first rotary body to be rotated by a drive source;
a first friction body locked to the first rotary body;
a second friction body stacked on the first friction body and to be rotated with rotation of the first friction body by a friction force between the first friction body and the second friction body;
a second rotary body locked to the second friction body;
at least one disc spring for biasing the first friction body and the second friction body in a stacking direction of the first friction body and the second friction body; and
a fastening member attached adjacent to the first rotary body for compressing the at least one disc spring,
wherein the first rotary body has a bottomed hole formed in a direction of a rotation axis of the first rotary body, and a first screw portion formed on an inner circumferential surface on an opening side of the first rotary body formed with the hole,
an outer circumferential surface of the fastening member and an outer circumferential surface of the first rotary body are flush,
the fastening member has a second screw portion corresponding to the first screw portion of the first rotary body, and a through-hole formed through a rotation axis of the fastening member,
the second rotary body is inserted into the through-hole to fix the at least one disc spring to the first rotary body without the second rotary body coming into contact with the fastening member.

2. The torque limiter according to claim 1, wherein
the first rotary body and the second rotary body have a same rotation axis,
the first friction body and the second friction body are stacked between the first rotary body and the second rotary body along the same rotation axis,
the at least one disc spring is arranged coaxially with the first rotary body and in contact with the first rotary body, and
the fastening member presses and fixes the at least one disc spring against the first rotary body.

3. The torque limiter according to claim 1, wherein
the first friction body and the second friction body are annular and arranged coaxially with the rotation axis of the first rotary body in the hole of the first rotary body,
the at least one disc spring is arranged coaxially with the rotation axis of the first rotary body and in contact with either the first friction body or the second friction body in the hole of the first rotary body,
the fastening member is fixed to the first rotary body by screwing the second screw portion and the first screw portion of the first rotary body while pressing the at least one disc spring, the first friction body and the second friction body against a bottom surface of the hole of the first rotary body, and the second rotary body is inserted through the through-hole of the fastening member and hollow portions of the annular first friction body and the second friction body, and is not in contact with the fastening member.

4. A drive device comprising:
the torque limiter according to claim 1;
a drive part for rotationally driving the first rotary body; and
a transmission part for transmitting rotation of the second rotary body to a drive target.

* * * * *